(12) United States Patent
Massard (10) Patent No.: US 7,032,067 B2
(45) Date of Patent: Apr. 18, 2006

(54) SECURITY TOKEN SHARABLE DATA AND SYNCHRONIZATION CACHE

(75) Inventor: Yves Massard, Fremont, CA (US)

(73) Assignee: Activcard, Suresnes Cedex (FR)

( * ) Notice: Subject to any disclaimer, the term of this patent is extended or adjusted under 35 U.S.C. 154(b) by 291 days.

(21) Appl. No.: 10/320,678

(22) Filed: Dec. 17, 2002

(65) Prior Publication Data

US 2004/0117574 A1    Jun. 17, 2004

(51) Int. Cl.
   *G06F 12/00*    (2006.01)
(52) U.S. Cl. ............................ 711/113; 711/3; 711/118; 711/163; 711/164; 711/167; 711/152
(58) Field of Classification Search ................ 709/225; 707/103 R; 711/3, 118, 113, 163, 164, 167
See application file for complete search history.

(56) References Cited

U.S. PATENT DOCUMENTS

| | | | |
|---|---|---|---|
| 5,941,947 A * | 8/1999 | Brown et al. ................ | 709/225 |
| 6,304,879 B1 * | 10/2001 | Sobeski et al. ......... | 707/103 R |
| 6,880,037 B1 | 4/2005 | Boyer | |
| 2001/0019614 A1 * | 9/2001 | Madoukh ..................... | 380/277 |
| 2002/0124082 A1 * | 9/2002 | San Andres et al. ........ | 709/225 |

OTHER PUBLICATIONS

"ActivCard Gold MS 2.6 Detailed Specification, ASPhat/Accoca fix for TSE, " Version 1.1, ActivCard Inc., Dec. 13, 2001, pp. 1-10.
Source code listing of library file of accoca.dll., pp. 1-3.
Source code listing of header file of aspcardCache.h., pp. 1-3.

* cited by examiner

*Primary Examiner*—Kevin L. Ellis
*Assistant Examiner*—Mardochee Chery
(74) *Attorney, Agent, or Firm*—Stevens, Davis, Miller & Mosher, LLP (57) ABSTRACT

This invention provides a system and method for implementing a middleware caching arrangement to minimize device contention, network performance and synchronization issues associated with enterprise security token usage. The invention comprises a token API mapped to a cache API. Logic associated with the token API preferentially retrieves information from a memory cache managed by the cache API. Mechanisms are included to periodically purge the memory cache of unused information.

24 Claims, 10 Drawing Sheets

SECURITY TOKEN SHARABLE DATA AND SYNCHRONIZATION CACHE

A portion of the disclosure of this patent document contains material subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The present invention relates generally to a data processing system and method and more specifically to remote transaction cache associated with a security token.

BACKGROUND

Security tokens are tamper resistant hardware devices used to securely store digital credentials, cryptographic keys and other proprietary information. The tokens are packaged in a convenient and easily transportable medium and generally communicate with a host client using standardized IEEE serial communications protocols. Examples of security tokens include smart cards, integrated circuit cards, subscriber identification modules (SIM), wireless identification modules (WIM), USB token dongles, identification tokens, secure application modules (SAM), secure multimedia tokens (SMMC) and like devices.

The single input/output nature of a serial connection is known to cause local device contentions when multiple requests to access the security token are received by the local client. In a multi-user networking environment, serial device contentions can impair network performance as each requesting remote service must wait in line for its request to be processed by a particular security token. The device contentions can be minimized to some extent by assigning priorities to the access requests. However, prioritization does not provide significant performance improvements in operating environments where a multitude of identically prioritized requests occur within a small time frame such as at the start or end of a work day where large numbers of entities are logging into or out of a network.

A second problem arises when the information contained in the security token is shared among multiple services, Information requested by one application may be altered, moved or deleted by another application resulting in application errors, system crashes and lost data. One solution known in the art is to exclusively lock the security token to a particular application until all transactions between the exclusive application and security token have been completed. This solution has limited usefulness though since exclusively locking the security token for prolonged periods may exacerbate the network performance issues described above.

Other solutions include the use of secure shared memory arrangements and caching techniques. Memory sharing is useful if the information to be shared does not require extensive security protocols to be implemented. While secure memory sharing mechanisms do exist, the increasing complexity of maintaining the integrity of the shared memory tends to be system resource intensive and inadvertent "security holes" are always a concern. Caching of information is another common technique which provides reasonable performance improvements. An example of a data object caching technique is disclosed in U.S. Pat. No. 6,304,879 to Sobeski, et al. This patent describes a reasonable caching technique suitable for data objects but is not well suited for implementation with a security token as there are no intrinsic security measures incorporated into the disclosed invention.

Thus, it would be highly advantageous to provide a reasonably secure caching mechanism suitable for implementation with a security token which addresses the limitations described in the relevant art above.

SUMMARY

This invention addresses the limitations described above. The caching mechanism comprises a security token interface applications programming interface (API) which is mapped to a cache API and may be installed in a local client, one or more servers or co-located in both the client and server(s).

The cache API receives requests for information from the security token interface API which includes a cross reference containing a specific unique identifier associated with the security token and an encoded semantic. The unique identifier is usually a serial number masked into the security token by the token manufacturer. Information is stored in the memory cache by associating the unique security token identifier with the semantic forming a unique cache identifier. It is also envisioned that semantics related to set of security tokens may be cached as well. For example, a semantic may be defined to determine which security tokens contain a digital certificate for updating purposes.

A separate unique cache identifier is required for each instance of information stored in the memory cache to differentiate data obtained from a single security token. In the preferred embodiment of the invention, handles are used in lieu of the actual serials numbers and/or semantics to simplify the various combinations of unique identifiers and semantics. Handles as defined herein include a pseudonym or token that a program can use to identify and access an object.

The cache API locates the particular security token record in the memory cache by using a handle related to the security token's unique identifier, a semantic or both to arrive at the unique cache identifier. If no occurrence of the requested information is included in the cache, the request is redirected to the token interface API for processing and retrieval of the information from a security token.

If the requested information is not present in the security token, a pseudo-entry is generated by the security token interface API and transferred to the cache API for storage in the memory cache. The pseudo-entry appears to the cache API as regular data entry and is used to prevent future requests for the same missing information being routed to the security token.

Once information is retrieved from the security token, the security token interface API transfers the information to the cache API for storage in the memory cache where it is available for future retrieval. The type of information to be cached is categorized as non-proprietary, proprietary and administrative. In the preferred embodiment of the invention, the memory cache is divided into three distinct components including a first component generally containing non-proprietary, a second component containing proprietary information, and a third component containing administrative information necessary to manage and utilize the information stored in the other portions of the memory cache. Dividing the memory cache into three separate components provides greater flexibility for future enhancements to the memory cache by simply adding additional cache components.

The types of information stored in the memory cache include digital certificates, public keys, password information, properties and configurations related to these datum, token management information, security state information and listings of applets installed inside the security token(s). It should be apparent to one skilled in the art that any information retrievable from a security token may be stored in the memory cache.

An additional feature of this invention includes a residence time limitation for which in formation remains in the memory cache. After a preset period without repeated access, all or the proprietary portion of the memory cache is flushed. To maintain synchronicity with the information retrieved from the security token, a counter mechanism is included to ensure that the calling application receives the latest version of information contained in the security token.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. It is intended that changes and modifications can be made to the described embodiment without departing from the true scope and spirit of the subject invention as defined in the claims.

DETAILED DESCRIPTION

This present invention provides a system and method for caching of information retrieved from a security token to minimize local device contentions, improve network performance and maintain consistency of information stored in an associated security token.

Figure 1:
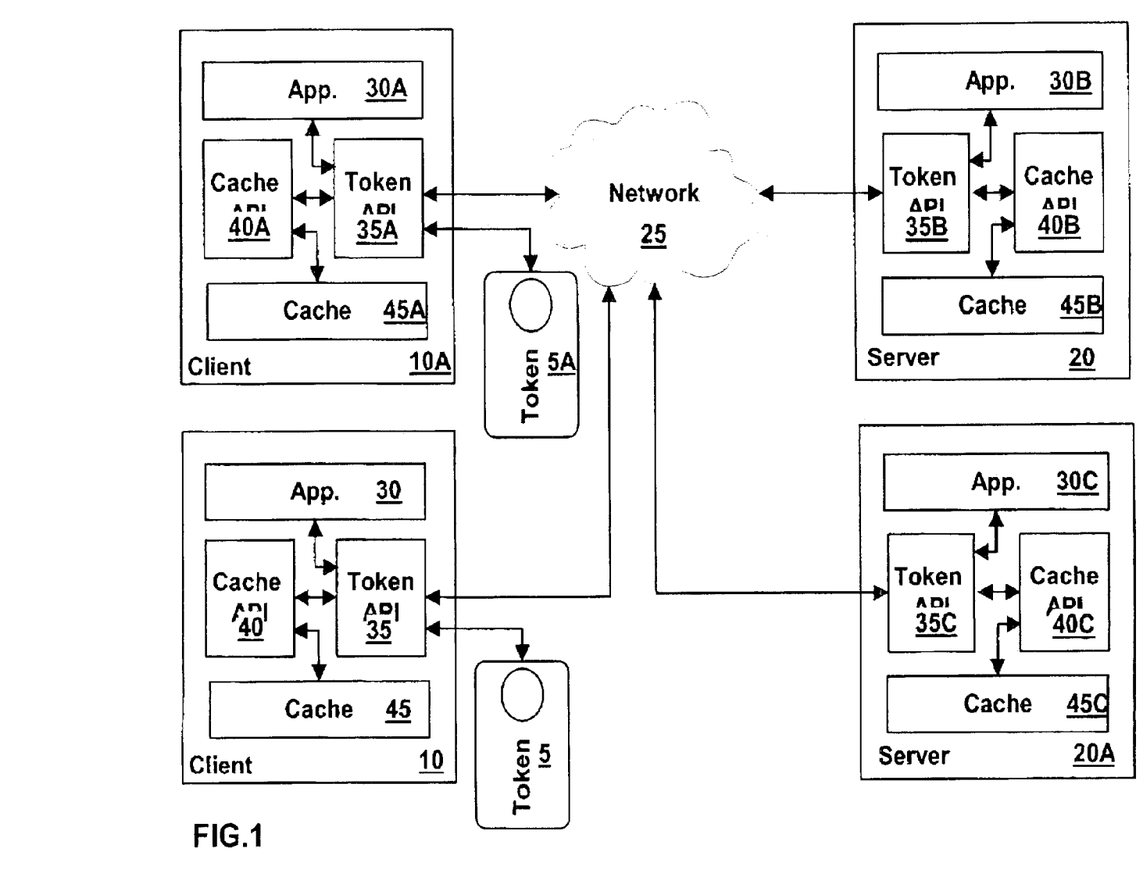
FIG. 1—is a generalized block diagram illustrating the placement of the invention in various computer systems.

Referring to FIG. 1, a security token 5 is shown operatively connected to a local client 10. The local client 10 may be in processing communications over a network 25 with one or more servers 20, 20A. The local client includes one or more applications 30 requiring access to information originally stored in the security token 5. The application 30 is associated with a token API 35. The token API 35 is a middleware applications programming interface which communicates with the security token 5 and a local cache API 40. Requests received from the application 30 usually include a unique identifier associated with a particular security token and a semantic which are converted by the token API 35 into a unique reference identifier for storage in the memory cache 45.

The invention may be installed on one or more local clients 10, 10A, one or more servers 20, 20A or both clients and servers 10, 10A, 20, 20A. Each instance of the invention operates independently of each other and may contain the same, overlapping or completely different information. The contents of each cache 45, 45A, 45B, 45C is dependent on information requests promulgated by each application 30, 30A, 30B, 30C to each token API 35, 35A, 35B, 35C and cached by each cache API 40, 40A, 40B, 40C.

For purposes of this invention, if remote caches are implemented rather than local caches, each local client provides the necessary hardware and software interfaces for the security token 5, 5A to communicate with each server 20, 20A but otherwise does not enter into the system.

Figure 1A:
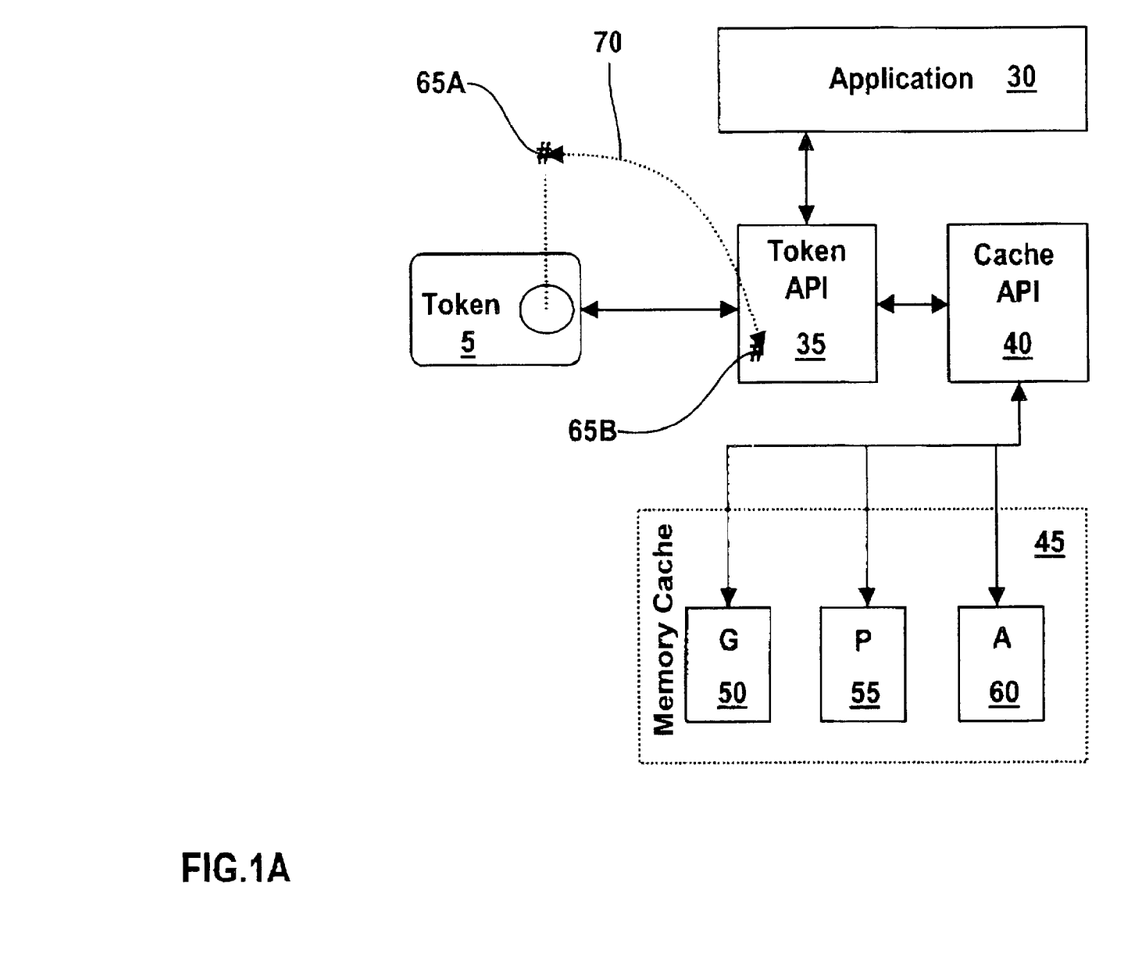
FIG. 1A—is a generalized block diagram illustrating the major components included in the invention.

FIG. 1A depicts the details of the invention. The application 30 is associated with a token API 35. The token API 35 is a middleware applications programming interface which communicates with the security token 5 and a cache API 40. A counter applet is installed in each security token which increments each time information is written to the security token. The incremented value # 65A is compared 70 to a reference value # 65B initially retrieved by the token API 35. If the incremented value # 65A does not match the reference value # 65B, the contents of the memory cache 45 are refreshed before information is released to the requesting application 30. In an alternative embodiment of the invention, a most recent process identifier (PID) is stored inside the security token which is compared against the PID initially retrieved by the token API to determine if a change has been made to the contents of the security token. Alternative methods such as maintaining and comparing time stamps will work as well.

The cache API 40 controls the memory cache 45. The memory cache 45 is divided into at least three components. The first component G 50 of the memory cache 45 retrievably stores generally uncontrolled information for example, public keys, digital certificates and other non-proprietary information. The second component P 55 of the memory cache 45 retrievably stores proprietary information for example, passwords and related information.

The third component A 60 retrievably stores administrative information used by the cache API 40 to retrieve information stored in the either the general or proprietary cache components 50, 55. The third component A 60 of the memory cache 45 may exist as part of the cache or as a separate lookup table and includes unique reference numbers, cross reference information, and time stamps associated with information stored in the memory cache 45.

Figure 2:
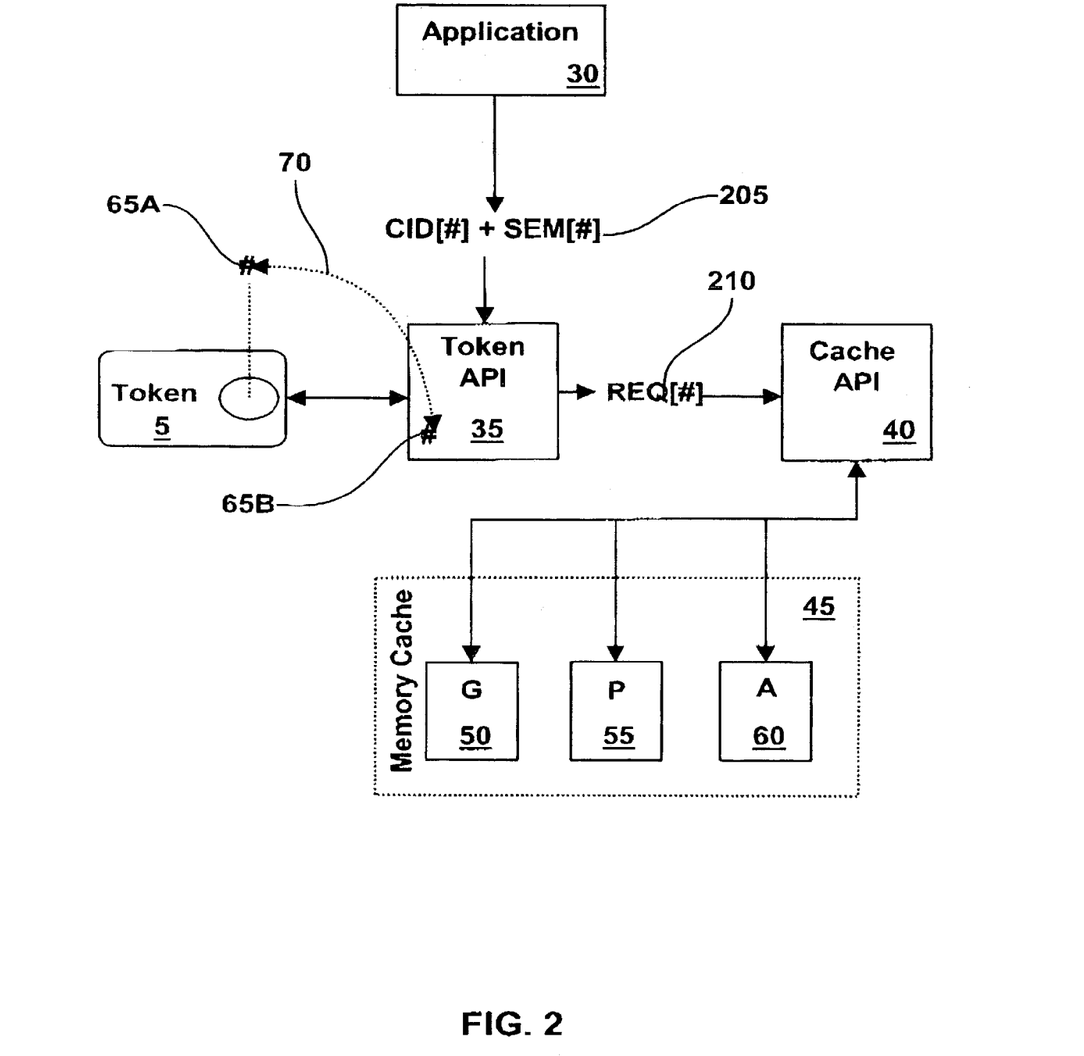
FIG. 2—is a detailed block diagram illustrating the routing and data content of a request for information.

FIG. 2 depicts the routing and processing of an incoming request 205. The application 30 generates or otherwise routes a request for information 205 to the token API 35. The request 205 includes numeric information concerning the unique token identifier CID[#] and/or a numeric semantic request SEM[#].

The token API 35 includes logical instructions to first determine if the requested information 205 is available from the cache API 40 and secondly if the information stored in the cache is current 70 before attempting to retrieve the information from the associated security token referenced by CID[#].

Figure 2A:
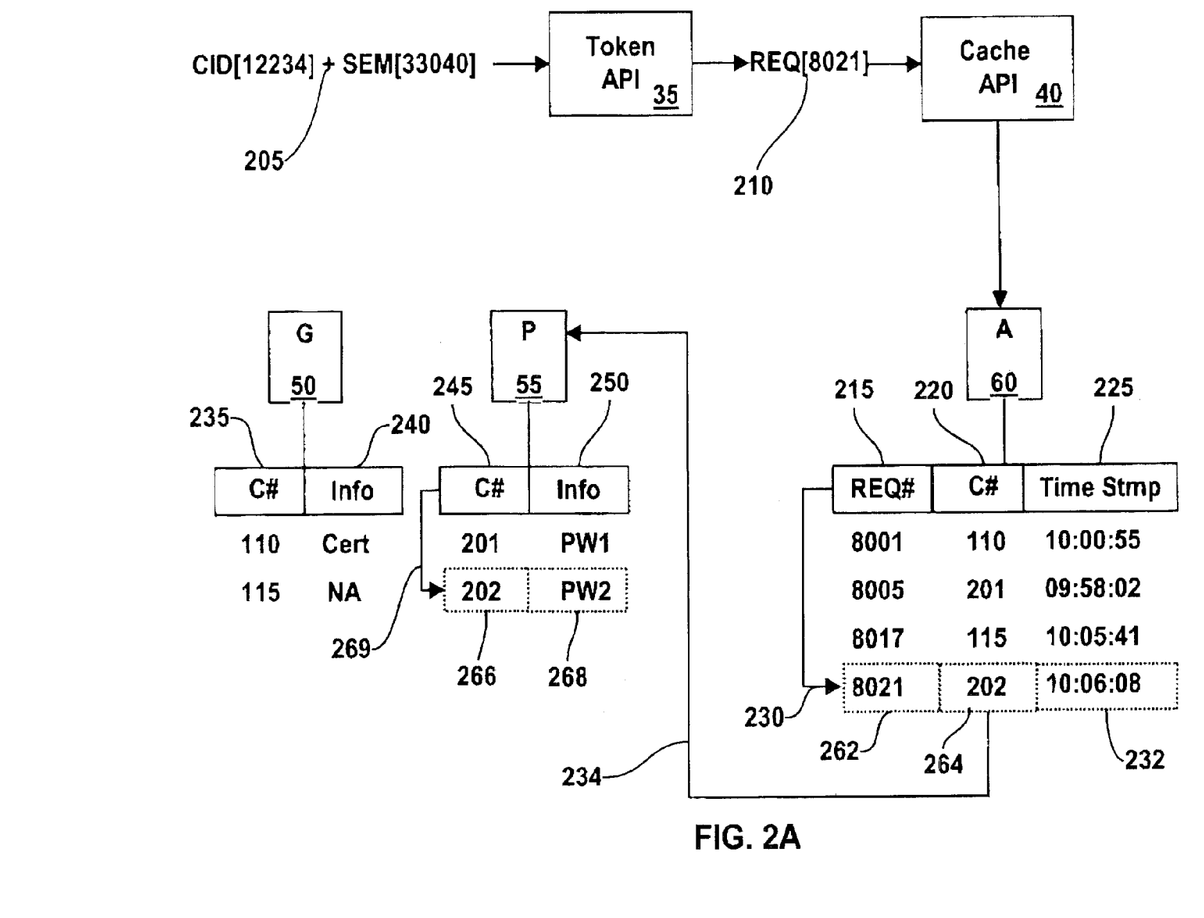
FIG. 2A—is a detailed block diagram illustrating the initial processing of the request for information by a cache API and associated memory cache components.

Referring to FIG. 2A, the cache API 40 converts the original request 205 into a unique reference identifier REQ [8021] 210 which is then routed to the cache API 40 for processing. The cache API 40 performs a lookup function 230 of unique references REQ# 215 contained in the administrative component 60 of the cache using the reference identifier 210. To better illustrate the lookup function, an example unique reference identifier REQ[8021] 210 is sent to the administrative component A 60 to determine if the requested information 210 has already been retrieved.

In this example, a match is found 230 indicating that the requested information 210 is already present in the memory cache 45. The unique cache identifiers C# 245 are used to both uniquely identify the requested information and also determine which cache component contains the information. In this example, cache identifiers beginning with the number 2 denotes proprietary information which is stored in the second cache component P 55. Cache identifiers beginning with a 1 are stored in the first cache component G 50 under cache identifier C# 235.

A new time stamp 232 is applied to the identified information 230. The time stamps 225 are used to define the residence time for information stored in the memory cache 45 and are adjustable to suit different operating conditions. If after a predetermined period has expired without repeat access to a particular piece of stored information, the unused information is flushed from the cache.

Figure 2B:
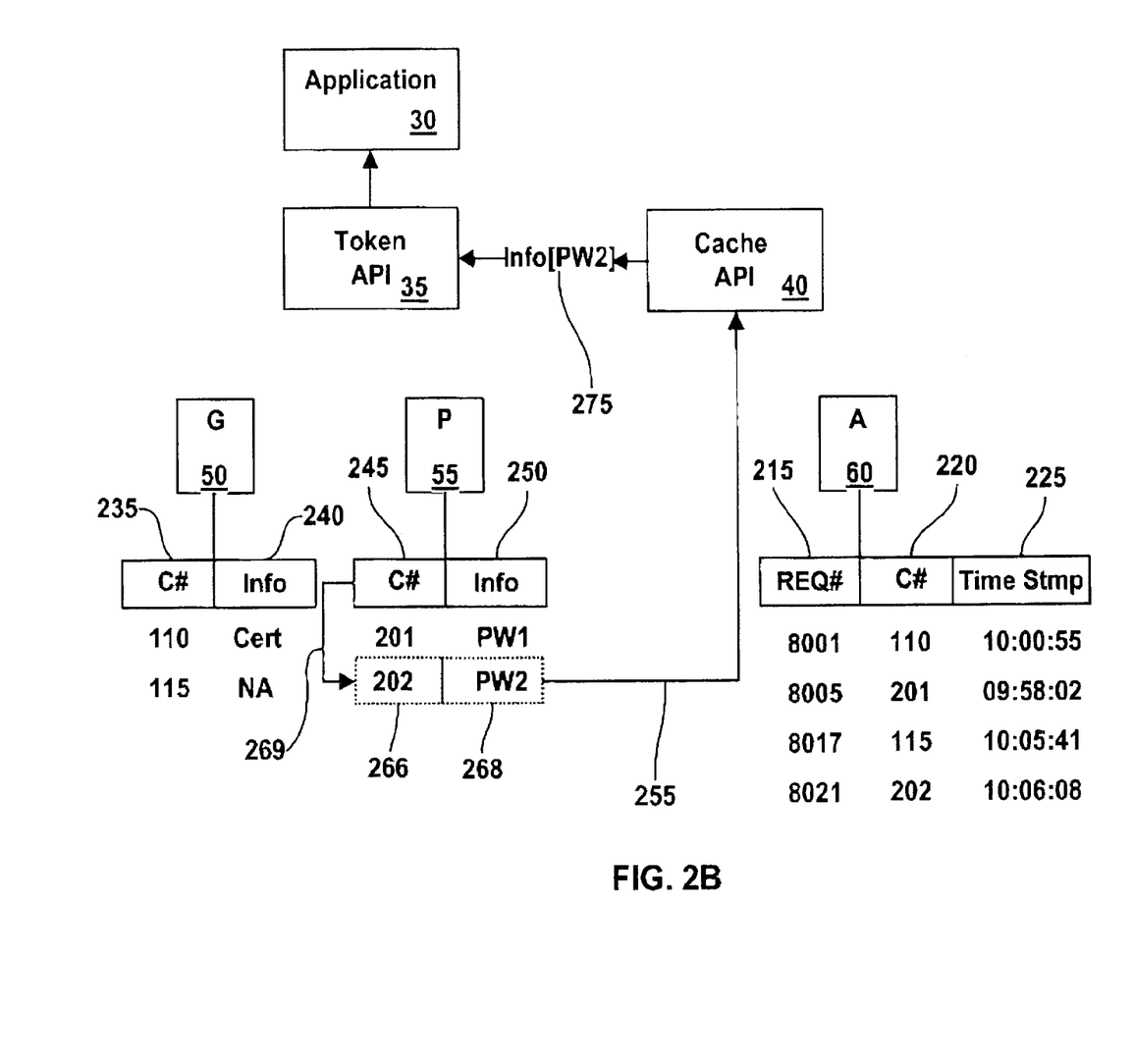
FIG. 2B—is a detailed block diagram illustrating the retrieval of the requested information from the memory cache.

FIG. 2B continues with the example described above, in which the unique cache identifier 202 264 points 234 to the second cache component P 55 which allows retrieval 269 of the information PW2 268 associated with unique cache identifier 202 266. The retrieved information 255 is then returned 275 to the calling application 30 via the token API 35.

Figure 2C:
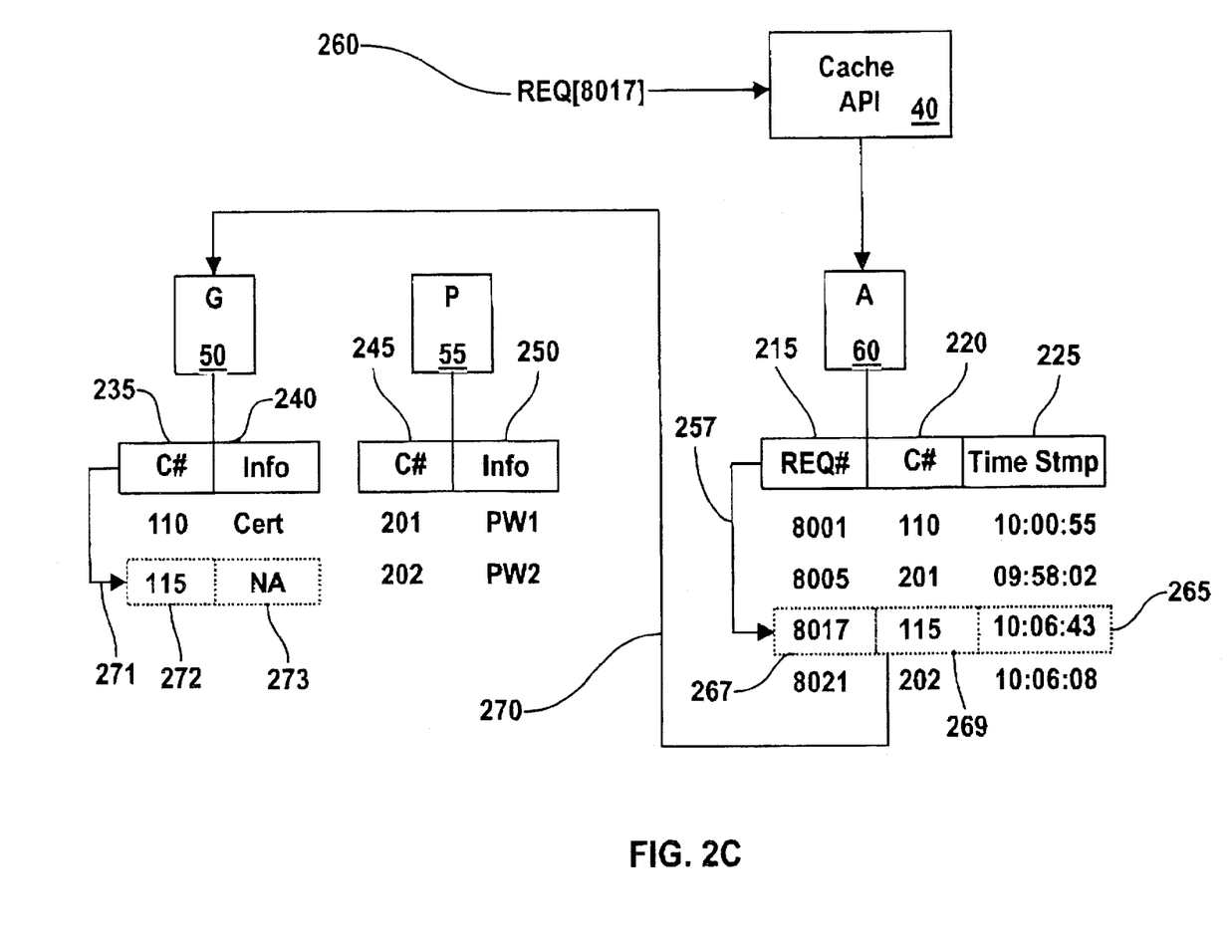
FIG. 2C—is a detailed block diagram illustrating the attempted retrieval of the requested information which is not available from an associated security token.

Referring to FIG. 2C, a problem could arise where a request for non-existent information causes repeat attempts to access the security token, defeating the purpose of the cache. To prevent this situation, after the first occurrence of the unavailable information, the cache API 40 generates a pseudo entry which is stored in the appropriate cache component 50, 55 by the cache API 40. Upon receipt of an otherwise valid request REQ[8017] 260, the cache API 40 performs a lookup 257 which points 270 to a pseudo entry 271 contained 272 in the first cache component G 50 and updates the time stamp 265 associated with this entry.

Figure 2D:
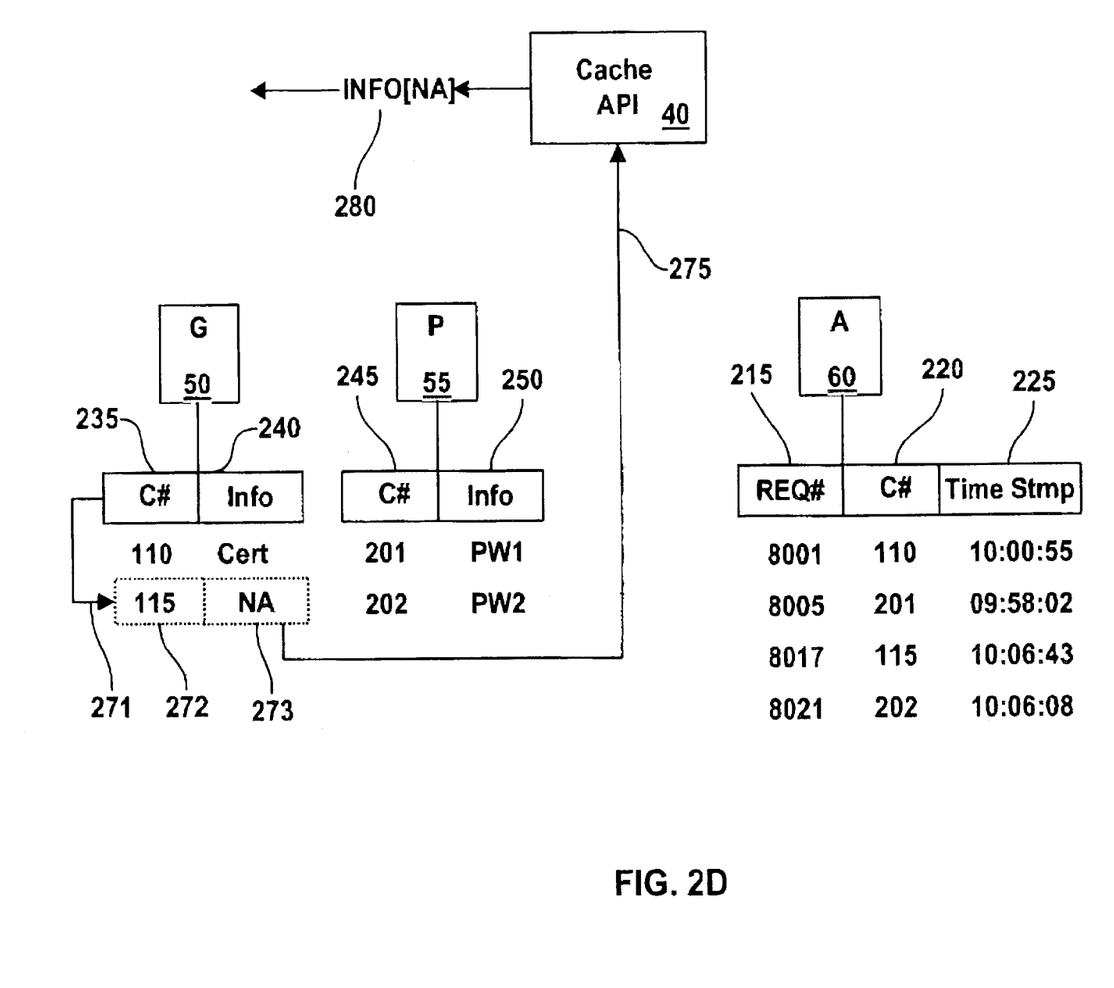
FIG. 2D—is a detailed block diagram illustrating the return of a not available message from the memory cache.

FIG. 2D continues with the example described in above, in which a 'not available' NA 273 message is retrieved 275 by the cache API 40 and forwarded INFO[NA] 280 to the requesting application.

Figure 3:
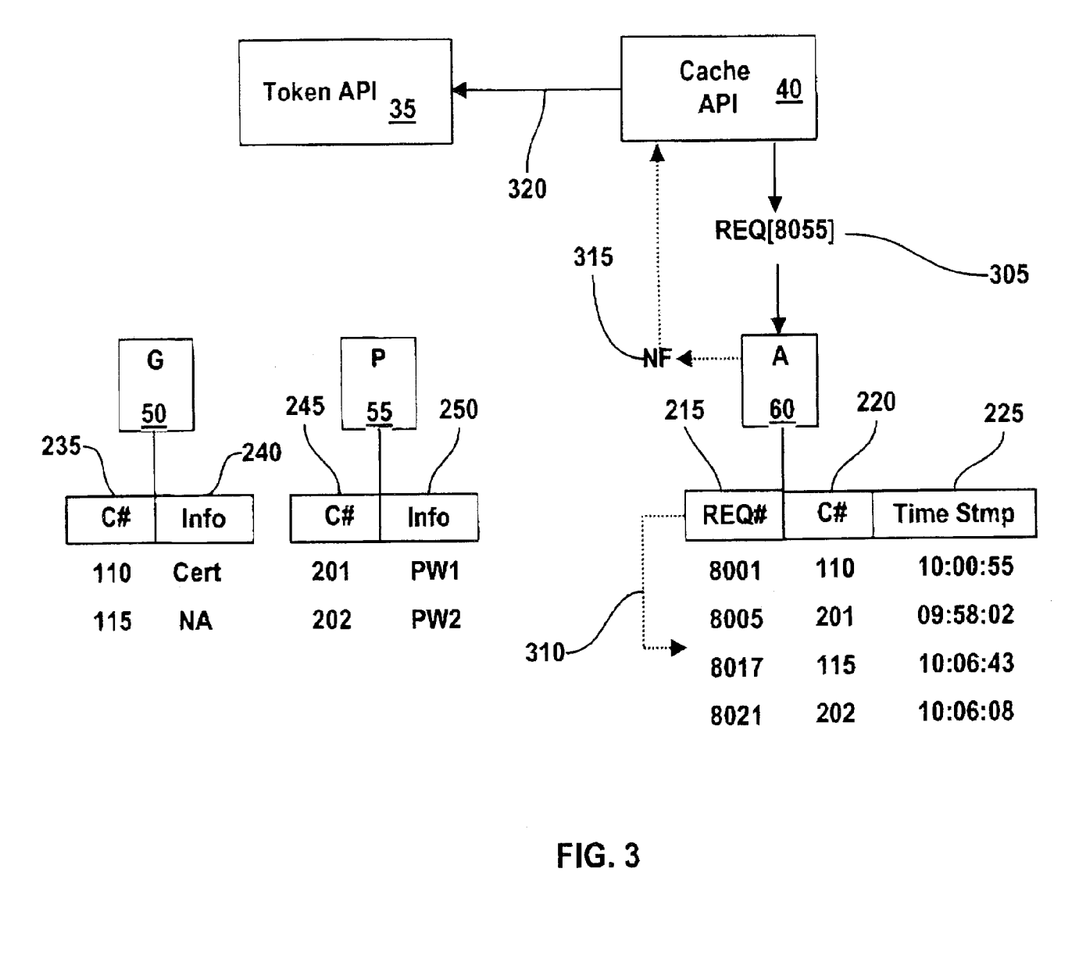
FIG. 3—is a detailed block diagram illustrating a request to retrieve information from the memory cache which has not yet been retrieved from the associated security token.

Referring to FIG. 3, this last example depicts the case where a request for information has not previously been processed. An incoming request 305 REQ[8055] is processed by the cache API 40 and no match is found 310. A not found message NF 315 is generated by the cache API and sent 320 to the token API 35 which signals the token API 35 to retrieve the information from the security token originally identified in the received request.

Figure 3A:
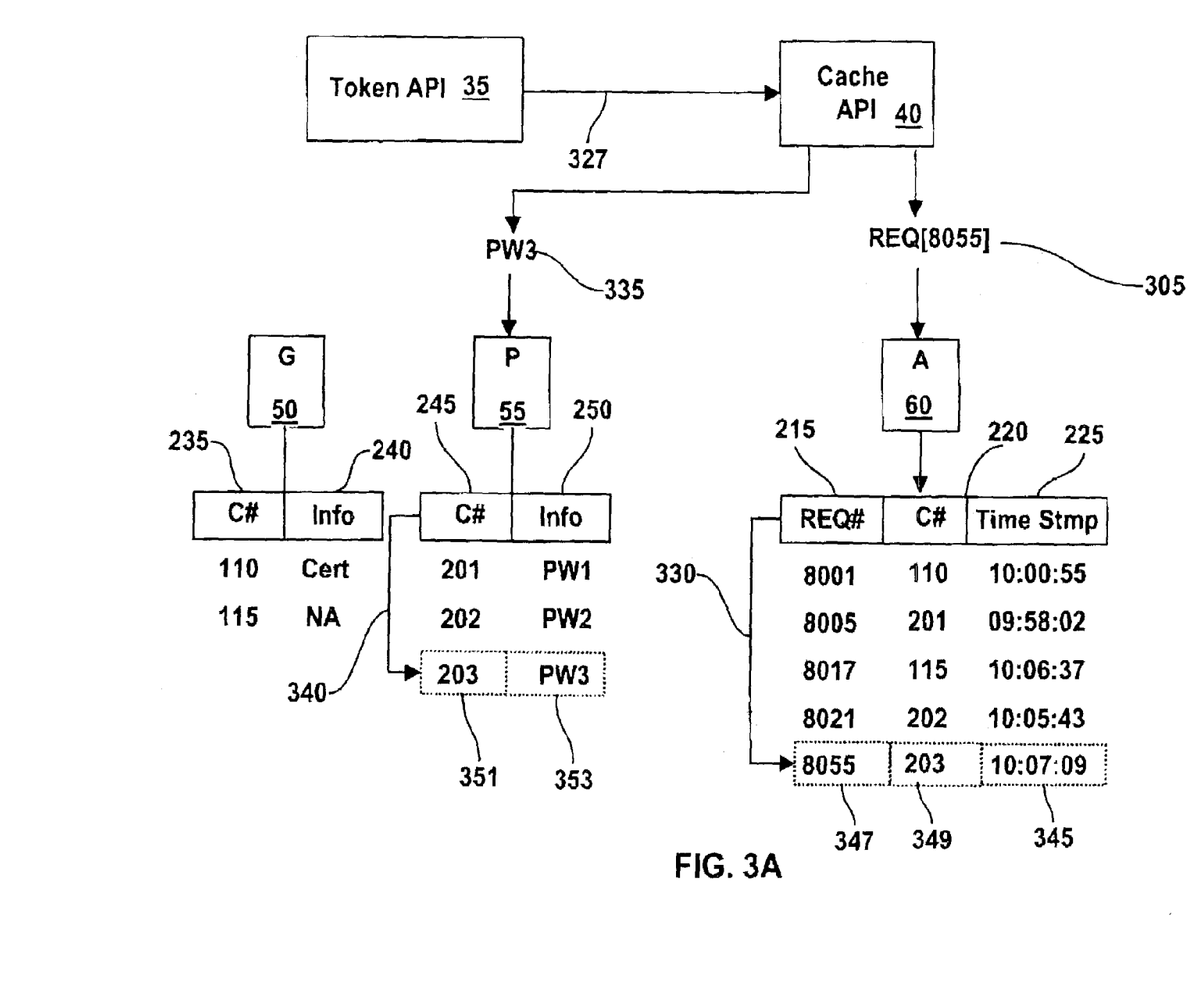
FIG. 3A—is a detailed block diagram illustrating a newly retrieved item being stored in the memory cache and generation of associated cross references FIG. 4—is a flowchart illustrating the major steps involved in implementing the preferred embodiment of the invention.

In FIG. 3A, the information is retrieved by the token API 35 and sent 327 to the cache API 40 for storage. A new entry 347 is added to the administrative cache component 330, a new cache ID 203 349 and a new time stamp 345 are assigned to the entry. The new information PW3 353 is stored 340 in the proprietary cache component according to the newly generated cache identifier 203 351.

Figure 4:
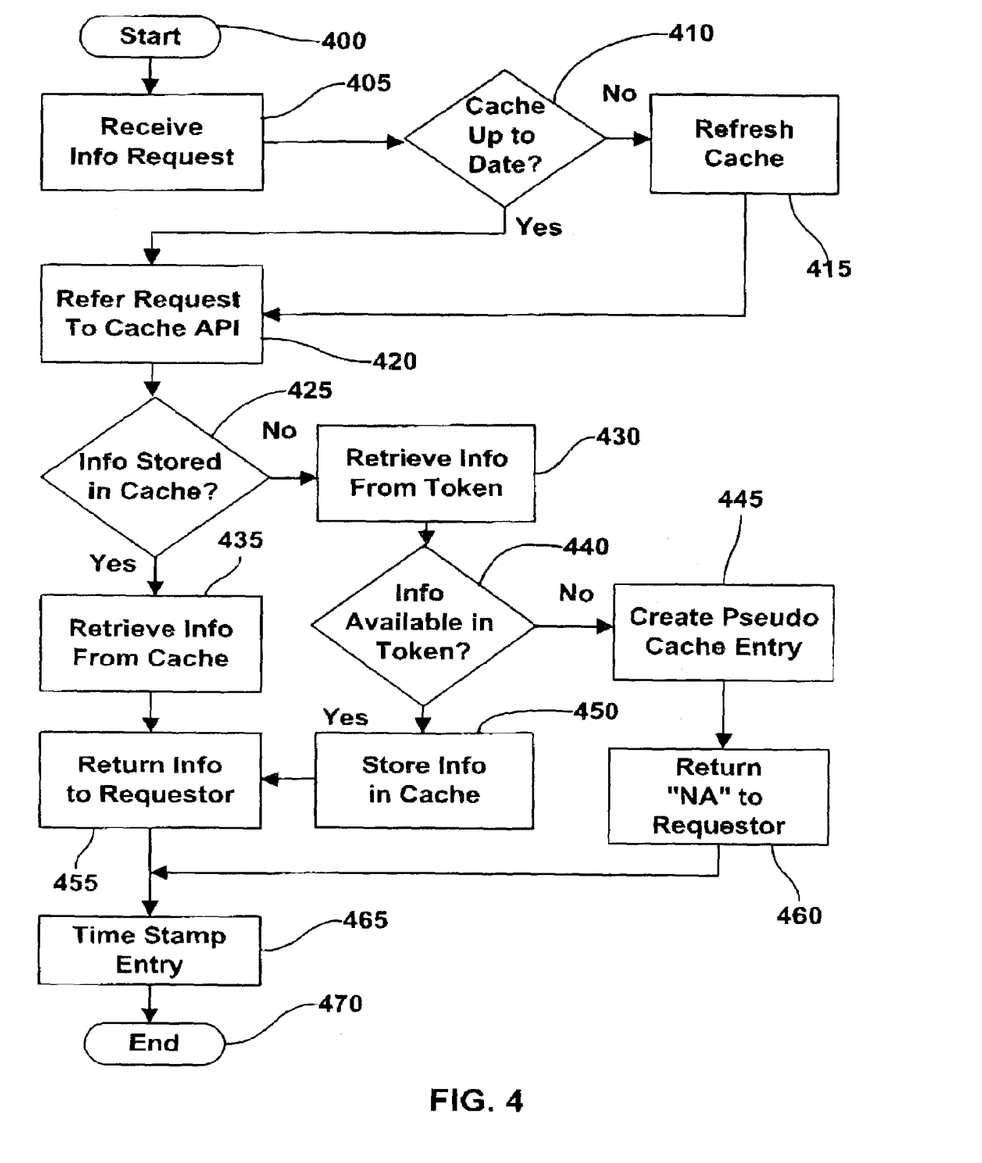

In FIG. 4, the steps to implement the preferred embodiment of the invention are depicted. The process is initiated 400 by a request for information being received 405 by the token API. The token API then determines if the information contained in the memory cache is current 410. If the information of the cache is current 410 the request is routed directly to the cache API for processing 420. If the information is not current 410, the cache is first refreshed 415 then referred to the cache API 420 for processing.

The cache API determines if the requested information is available from the cache 425. If the information is not available from the cache 425 the cache API notifies the token API to retrieve the information from the associated security token 430. If the information is not available from the security token 440, the token API generates a pseudo cache entry 445 which is stored in the memory cache by the cache API, a not available "A" message is returned to the requester 460, a new time stamp entry is created 465 by the cache API, followed by processing termination 470.

If the information is available from the security token 450, the information is retrieved, a copy stored in the memory cache 450, the information returned to the requestor 455, a new time stamp entry is created 465 for the new entry by the cache API, followed by processing termination 470.

If the information is directly available from the cache 425, the cache API retrieves the information from the cache 435, the information returned to the requestor 455, the time stamp entry is updated 465 by the cache API, followed by processing termination 470.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. No specific limitation is intended to a particular security token operating environment. Other variations and embodiments are possible in light of above teachings, and it is not intended that this Detailed Description limit the scope of invention, but rather by the claims following herein.

What is claimed:

1. A system for caching information retrieved from at least one hardware security token, comprising said at least one hardware security token, a security token interface application programming interface (API), a cache API and at least one memory cache, wherein:

said at least one hardware security token is in processing communications with said security token interface API and includes information retrievable by said security token interface API, said security token interface API is functionally associated with said cache API, said security token interface API including means for retrieving said information from said at least one hardware security token, means for sending said retrieved information to said cache API and means for requesting said retrieved information from said cache API, and said cache API is functionally associated with said at least one memory cache, said cache API including means for storing said retrieved information in said at least one memory cache, means responsive to said request by said security token interface API for locating and returning said retrieved information from said at least one memory cache to said security token interface API.

2. The system according to claim 1 wherein said security token interface API further includes logic means for first requesting retrieval of said information from said cache API before attempting to retrieve said information from said at least one hardware security token.

3. The system according to claim 2 wherein said logic means further includes means to determine if said information stored in said at least one memory cache is current.

4. The system according to claim 1 wherein said request includes a unique hardware security token identifier, a semantic, or a unique hardware security token identifier and a semantic.

5. The system according to claim 4 wherein said security token API further includes means for associating said unique hardware security token identifier with said semantic for generating a unique reference identifier.

6. The system according to claim 5 wherein said cache API further includes means for associating said unique reference identifier with a unique cache identifier.

7. The system according to claim 6 wherein said unique cache identifier is further associated with said retrieved information in the form of a retrievable data record.

8. The system according to claim 7 wherein said data record is retrievably stored in said at least one memory cache.

9. The system according to claim 1 wherein said cache API further includes means for generating and storing a pseudo-entry if said requested information is not present in said at least one hardware security token.

10. The system according to claim 9 wherein said pseudo-entry is stored in said at least one memory cache by said cache API to prevent future requests for the same type of information from attempting to be retrieved from said at least one hardware security token.

11. The system according to claim 1 further including means to limit the residence time in which at least a portion of said information is stored in said at least one memory cache.

12. The system according to claim 1 further including means for maintaining synchronicity with said information retrieved from said at least one hardware security token.

13. The system according to claim 1 wherein said information includes digital certificates, public keys, passwords, active session counters, security token properties and configurations, security token management information, security state information and a listing of applications installed inside said at least one hardware security token.

14. The system according to claim 1 wherein said at least one memory cache is maintained in a remote server.

15. The system according to claim 1 wherein said at least one memory cache is maintained in a local client.

16. The system according to claim 1 wherein said at least one memory cache is maintained in both a local client and remote server.

17. The system according to claim 1 wherein said at least one memory cache is maintained in a plurality of local clients and remote servers.

18. A method for caching information retrieved from at least one hardware security token comprising the steps of:
   a. receiving a request for at least a portion of said information by a security token interface application programming interface (API) which is in processing communications with said hardware security token,
   b. referring said request for said at least a portion of said information to a cache API functionally associated to said security token interface API,
   c. determining if said at least a portion of said information exists in at least one memory cache associated with said cache API,
   d. retrieving said at least a portion of said information from said at least one memory cache if available,
   e. retrieving said at least a portion of said information from said hardware security token if not available in said at least one memory cache, and,
   f. storing said retrieved information in said at least one memory cache.

19. The method according to claim 18 wherein said request includes a unique identifier associated with said hardware security token and a semantic.

20. The method according to claim 19 wherein said at least a portion of said information is retrieved from said at least one memory cache using a unique cache identifier associated with, both said unique hardware security token identifier and said semantic.

21. The method according to claim 18 further including the steps of:
   a. verifying if said information stored in said at least one memory cache is current,
   b. if not, retrieving current information from said hardware security token,
   c. periodically purging said cache if no requests for said at least a portion of said information are received within a predetermined time frame.

22. A computer program product embodied in a tangible form for caching information retrieved from at least one hardware security token, with instructions executable by a processor for and performing the steps of:
   a. receiving a request for at least a portion of said information by a security token interface application programming interface (API) which is in processing communications with said hardware security token,
   b. referring said request for said at least a portion of said information to a cache API functionally associated to said security token interface API,
   c. determining if said at least a portion of said information exists in at least one memory cache associated with said cache API,
   d. retrieving said at least a portion of said information from said at least one memory cache if available,
   e. retrieving said at least a portion of said information from said hardware security token if not available in said at least one memory cache,
   f. storing said retrieved information in said at least one memory cache.

23. The computer program product according to claim 22 wherein said request includes a unique identifier associated with said hardware security token and a semantic.

24. The computer program product according to claim 22 wherein said at least a portion of said information is retrieved from said at least one memory cache using a unique cache identifier associated with both said unique hardware security token identifier and said semantic.

* * * * *